(12) United States Patent
Aggarwal et al.

(10) Patent No.: US 6,285,811 B1
(45) Date of Patent: Sep. 4, 2001

(54) NEAR-FIELD OPTICAL MICROSCOPE WITH INFRARED FIBER PROBE

(75) Inventors: Ishwar D. Aggarwal, Fairfax Station, VA (US); Jasbinder Sanghera, Greenbelt, MD (US); David Schaafsma, Vista, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/267,919

(22) Filed: Feb. 25, 1999

(51) Int. Cl.[7] .................................................. G02B 6/32
(52) U.S. Cl. ................. 385/31; 385/32; 385/34; 250/206
(58) Field of Search ................... 385/31, 32, 33, 385/34, 147, 141, 142, 144; 250/306, 307, 216, 234

(56) References Cited

U.S. PATENT DOCUMENTS

| | | | |
|---|---|---|---|
| 4,992,659 | * 2/1991 | Abraham et al. | 250/306 |
| 5,254,854 | * 10/1993 | Betzig | 250/234 |
| 5,894,122 | * 4/1999 | Tomita | 250/234 |
| 5,949,935 | * 9/1999 | Schaafsma et al. | 385/43 |

* cited by examiner

Primary Examiner—Frank G. Font
Assistant Examiner—Sang H. Nguyen
(74) Attorney, Agent, or Firm—John J. Karasek; Jane B. Marciniszyn

(57) ABSTRACT

A near field optical microscope according to the present invention has (1) a single mode infrared optical fiber made from chalcogenide glass, chalcohalide glass, or a combination thereof, having a probe end adapted as a probe for near field optical microscopy, and further adapted for positioning within a near optical field of a sample; (2) a source of infrared light; for illuminating the sample; (3) a detector of infrared light; for detecting infrared light reflected from, emitted by, or transmitted through the sample, where at least one of the source of infrared light and the detector of infrared light are optically coupled to a distal end of the single mode infrared optical fiber.

6 Claims, 1 Drawing Sheet

NEAR-FIELD OPTICAL MICROSCOPE WITH INFRARED FIBER PROBE

BACKGROUND OF THE INVENTION

1. Field of the Invention

The present invention relates generally to near field optical microscopy, and in particular to a near-field optical microscope with an infrared fiber probe.

2. Description of the Related Art

For a standard microscope objective lens with a circular aperture, the diffraction of light through the aperture limits the smallest size that can be resolved by the objective. This diffraction is governed by the wavelength of light and the numerical aperture (half the inverse of the f-number) of the objective:

$$D = \frac{1.22\lambda}{NA}$$

where D is the diameter of the Airy disk (the minimum resolvable spot), $\lambda$ is the wavelength of the light that illuminates the subject, and NA is the numerical aperture of the lens, which must fall between 0 and 1. For a given wavelength, D is obviously smallest when the numerical aperture is closest to one. For real objectives a numerical aperture of one is physically impossible, but if we use this as the limiting value, then the minimum resolvable spot still works out to about 20% larger than the wavelength of the light used. For a microscope operating in the infrared (about 2–12 $\mu$m), this means that the minimum resolvable spot will be much larger than one micrometer.

This limitation arises because the image is formed in the far field, at distances much greater than the wavelength of the light, after Fraunhofer diffraction has occurred. If, on the other hand, light is collected and an image formed in the near field, at distances shorter than a wavelength, the resolution is limited primarily by the size of the aperture used for the collection. This is the principle behind the scanning near field optical microscope (SNOM). The aperture can be of any kind, but due to the requirements for precise probe-to-specimen distance regulation, probes with very sharp tips and small cross-sectional area, like wires or optical fibers, are ideally suited to this application.

By tapering an optical fiber down to a very small tip diameter, it is possible to achieve resolution much smaller than the diffraction-limited spot size. Using a variety of methods such as etching or heat tapering, tips have been fabricated which yield optical resolution on the order of 50 nm. Aided by the superior resolution of these probes, investigations have been made of submicron implanted regions on semiconductor wafers, individual molecules in an organic film, and a host of other biological and inorganic specimens. A variety of permutations on the basic SNOM technique allows for even greater resolution or special sensitivity. Probes utilizing the magneto-optic Kerr effect (MOKE) have been used to image magnetic domains with 10 nm resolution. SNOM probes can also be used in atomic force (AFM) mode and as a type of "tunneling" optical probe, and also provide species identification which is unavailable from the STM and SFM (AFM) techniques. Spurred by the push for smaller linewidths in semiconductor fabrication, SNOM probes have been used to create near-field lithographic patterns using direct writing with ultraviolet beams. The demand for imaging capabilities from near-field optics has also led to the creation of arrays of SNOM probes and video-rate scanning techniques.

Though many applications such as biological imaging and semiconductor wafer inspection would benefit substantially from infrared optical probes with SNOM resolution, little work has been done in this area, and even less with optical transmission, reflection or excitation probes. Several of the types of fibers that transmit in the infrared, such as fluoride glass fibers and sapphire fibers, are unsatisfactory, due to transmission limitations in the IR. On the other hand, chalcogenide and chalcohalide glasses transmit well in the 2–12 $\mu$m region.

SUMMARY OF THE INVENTION

Accordingly, it is an object of this invention to provide near field optical microscopes for the infrared band.

It is a further object of this invention to provide such near field optical microscopes with a transmission, reflection, or excitation probe.

These and additional objects of the invention are accomplished by the structures and processes hereinafter described.

A near field optical microscope according to the present invention has (1) a single mode infrared optical fiber made from chalcogenide glass, chalcohalide glass, or a combination thereof, having a probe end adapted as a probe for near field optical microscopy, and further adapted for positioning within a near optical field of a sample; (2) a source of infrared light; for illuminating the sample; (3) a detector of infrared light; for detecting infrared light reflected from, emitted by, or transmitted through the sample, where at least one of the source of infrared light and the detector of infrared light are optically coupled to a distal end of the single mode infrared optical fiber.

BRIEF DESCRIPTION OF THE DRAWINGS

A more complete appreciation of the invention will be obtained readily by reference to the following Description of the Preferred Embodiments and the accompanying drawings in which like numerals in different figures represent the same structures or elements, wherein.

DETAILED DESCRIPTION OF THE PREFERRED EMBODIMENTS

Chalcogenide and chalcohalide optical fibers are made following the teachings of the present inventors in recent issued patents and pending patent applications. The following are incorporated by reference herein, in their entireties and for all purposes:

(A) U.S. Pat. No. 5,779,757, "Process For Removing Hydrogen And Carbon Impurities From Glasses by Adding a Tellurium Halide", issued Jul. 14, 1998 to Sanghera et al.;

(B) U.S. Pat. No. 5,735,927, "Method for Producing Core/clad Glass Optical Fiber Preforms Using Hot Isostatic Pressing", issued Apr. 7, 1998 to Sanghera et al.;

(C) U.S. Pat. No. 5,879,426, "Process For Making Optical Fibers From Core and Cladding Glass Rods", issued on Mar. 9, 1999, to Sanghera et al.;

(D) U.S. Pat. No. 5,900,036, "Multi-Cylinder Apparatus for Making Optical Fibers, Process and Product", issued on May 4, 1999, to Mossadegh et al.

(E) U.S. Pat. No. 5,949,935, Infrared Optical Fiber Coupler, issued on Sep. 7, 1999, to Schaafsma et al.

Figure 1:
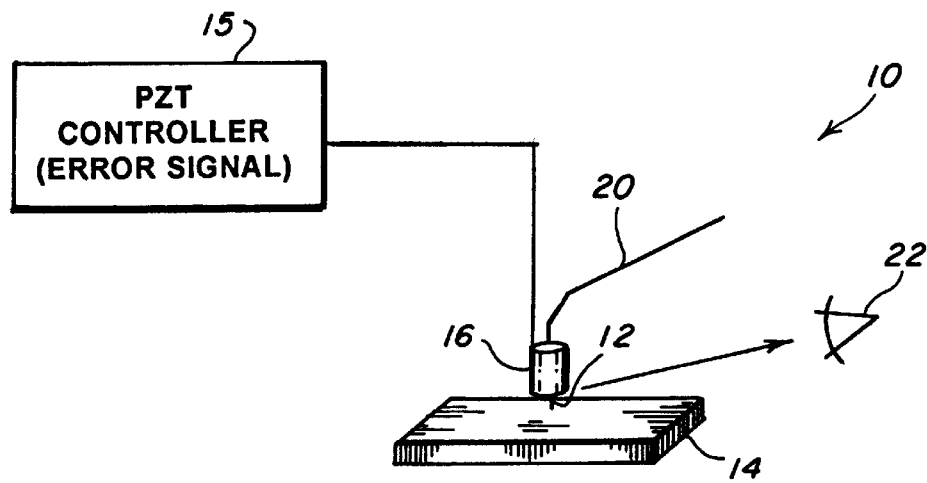
FIG. 1 is a schematic of a near field optical microscope according to the invention.

Referring to FIG. 1, an infrared SNOM 10 according to the invention has a single mode optical fiber tip 12 of a chalcogenide or chalcohalide glass, positioned in proximity (i.e., within range of the near optical field) of a sample 14. Movement of the tip 12 is controlled by an actuator 16, typically a piezoelectric actuator for moving the tip in three spatial directions. The actuator is in turn controlled by an electronic controller 18 to which it is electronically coupled.

In a typical mode of operation, infrared light, typically in the mid-IR to long-IR bands,, is launched down a single mode optical fiber 20 of a chalcogenide or chalcohalide glass, which carries the light to the tip 12, which emits the light where, within its near field, it interacts with the sample, and reflected light from the sample is detected by a detector 22, typically positioned in the far field.

Figures 2A, 2B, 2C:
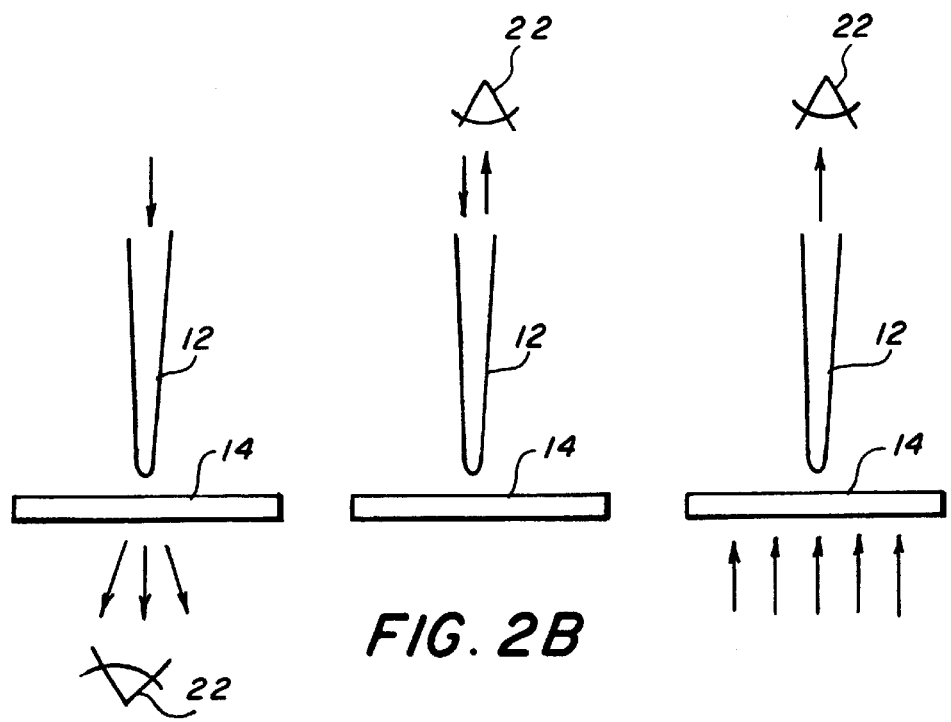
FIGS. 2A through 2C are schematics showing alternative optical pathways for a near field optical microscope according to the invention.

Alternatives to this configuration are within the scope of the invention. Referring to FIG. 2A, for a transparent specimen, light from the tip may be directed to the specimen, and the light that passes through the transparent specimen may be detected by a detector 22 on the opposite side of the specimen 14 from the tip 12. Referring to FIG. 2B, light from the tip may be directed to the specimen, where it may be reflected back into the fiber, and transmitted back to the detector 22. Referring to FIG. 2C, for a transparent specimen, light from an illumination source may be directed to the specimen, and the light that passes through the transparent specimen may be detected by a detector 22 coupled to the tip 12 through the fiber (not shown), on the opposite side of the specimen 14 from the light source. there are a number of variations on the basic SNOM scheme. Light may be injected into the specimen perpendicular the tip axis and then guided by internal reflection under the surface of the specimen. When the light traverses the point where the tip is in close proximity to the surface, its evanescent field couples to the dielectric medium of the tip and energy (light) is transferred into the tip and then up the fiber. This is commonly called photon scanning tunneling microscopy or PSTM. Collimated light may also be impinged at grazing incidence on the specimen surface around the region where the tip scans. In this case, the vibration of the tip causes fluctuations in the local field at the surface, which then scatter the incident light away from the specimen, to be collected in the far field above the probe. Internally reflected light can also be used to generate surface plasmons which are then scattered by the probe tip; the attenuated signal is then detected by conventional means.

In order to transmit optical signals in the infrared (beyond the transmission window of ordinary silica glass), infrared fiber must be used to make the probe tips. The tips can be coated with metal and then etched (using a highly sensitive technique such as ion milling) to create a small aperture in order to decrease the spot size and increase the resolution. Metal coating also helps to cut down the amount of stray light collected by the tip. Uncoated tips are also used in a number of configurations (such as the evanescent or scattering modes noted above).

Probe tips of sub-micrometer diameters have been fabricated from multimode and singlemode $As_2S_3$ optical fiber made at NRL. The tips were made using the same heat-and-pull procedure that is standard for making SNOM tips from ordinary silica fiber, with several modifications to accommodate the different properties of the chalcogenide glass. The pulling was controlled by a standard micropipette puller and the heat was supplied by an Ar laser running in single-line mode at 514 nm. The transmission properties of this fiber have been shown to be quite good and thus the only significant attenuation factor in the probe tips remains the same geometric one as exists in standard SNOM tips. Higher Fresnel losses in the chalcogenide fiber can be compensated by applying antireflection coatings.

The aspect ratio of the fiber tip-in particular the length, width and taper angle of the pre-taper and the microtip itself and the radius of curvature of the tip (which determines the aperture size) can be controlled by varying the heating and pulling parameters, as described by Valaskovic et al. These parameters are significantly different from the ordinary silica process due to the lower melting temperature, lower tensile strength, and steeper viscosity-temperature profile of the chalcogenide glasses, as well as their need for inert atmosphere control.

These probe tips, made from chalcogenide and chalcohalide fibers, are ideally suited to ultramicroscopy applications in the mid-infrared, between 2 and 12 $\mu$m. The characteristic IR absorption bands of organic compounds such as photoresist or even biological specimens can be used to create high resolution images of narrow-linewidth semiconductor wafers or individual cancer cells or a host of other subjects. High power infrared beams can be used to ablate materials or expose resists or create second order effects on a very small scale. In addition, some commonly used techniques can be combined with these probes to perform advanced analysis, such as Fourier transform infrared (FTIR) spectroscopy with submicron resolution. In short, these tips are the technology that enables a vast array of infrared microscopy and spectroscopy applications.

Having described the invention, the following examples are given to illustrate specific applications of the invention, including the best mode now known to perform the invention. These specific examples are not intended to limit the scope of the invention described in this application.

EXAMPLE 1

Infrared SNOM (IR-SNOM) probes were made from singlemode arsenic sulfide fiber (with outside diameter selected anywhere between 80–140 $\mu$m, and core approximately 10 $\mu$m), fabricated and tested at the Naval Research Laboratory as described in Mossadegh et al., J. Lightwave Tech. 16 214 (1998). The tips were made using a standard micropipette puller (Sutter P-2000), with either a heated filament or an external visible laser used to soften the fiber. The laser source supplied with the pipette puller would not work in this case, since the chalcogenide fiber is transparent to CO: radiation. In addition, the 160 g static tension of the micropipette puller was often enough to break the thin-diameter chalcogenide fiber, so a counterbalance system had to be devised to relieve some of the static load. As described below, the detection of fiber velocity plays a crucial role in making microtips in this way, so care was taken to use the minimum amount of weight for the counterbalancing.

Variations on standard silica fiber tip geometry from the parameters of velocity, delay, and pull strength available through this pipette puller's interface have been described at length in other reports (Valaskovic et al., Appl. Opt. 34, 1215 (1995); Essaidi et al., Appl. Opt. 37, 609 (1998)), so we will simply state that we used a standard matrix-experimentation approach when searching this parameter space for suitable chalcogenide settings. It should be noted that our parameter set also included variability in laser/heater intensity and counterweighting.

The tip fabrication techniques studied can be grouped into two categories: laser-heated and furnace-heated. The laser heating experiment was undertaken first, using the 514 nm line of an argon laser focused down by a cylindrical lens onto the fiber. Though many chalcogenide glasses exhibit a strong thermal runaway effect with laser heating, due to a large positive increase in the absorption coefficient with temperature, it was hoped that the softening and subsequent thinning of the fiber would provide a good limit to this process. However, we observed a sharp threshold in laser power for tip formation: below a certain level, the fiber would not soften at all; above that level, the softening and breakage were almost instantaneous. The tips produced by this method, although often of very small radius, were very asymmetric, exhibiting much greater melting effects on the side of the fiber exposed to the laser. Simple retroreflection and retrofocusing of the laser beam did not alleviate this problem. Unfortunately, it does not appear possible to control the thermal runaway without some means of regulating the optical dose put into the fiber.

To fabricate the tips using a thermal source, small wound heaters of approximately 6 mm inside diameter were constructed from standard Nichrome wire; the optimum length of the hot zone was determined to be about 3 mm. The heating system was similar to one which we have described previously for making chalcogenide fiber couplers (Schaafsma et al., J. Lightwave Tech. 15, 2242 (1997)). Counterweighting was adjusted to inhibit static breakage of the fiber, which was completely stripped of its coating and cleaned with solvents.

The most significant influence on tip formation was found to be the heater current, controlling both the heating rate and the ultimate furnace temperature. How the fiber softens and flows to allow good tips to form under a given load is determined largely by how the viscosity of the glass changes in time. In chalcogenides, the slope of the viscosity versus temperature curve is steeper than in silica, so the range of temperature control is correspondingly narrower. At low currents, sufficient just to soften the fiber and allow viscous flow, the resulting tapers were rounded at very large diameters and had no useable tips. This indicates that the fiber did not soften over a large enough area to promote even flow and thus a smooth taper and a good tip. At high currents, where the onset of flow occurred very quickly, the tapers were often narrow and of very small tip diameter, but the viscosity of the fiber was low enough that the tapers deformed or curled more often than not. This deformation was exacerbated by the viscoelastic deformation that some of the fibers had undergone from being stored on a spool for more than a year, which led to exaggerated lateral recoil when the two parts of the fiber separated.

Using a suitable heater setting, the next biggest influence on tip formation was the velocity parameter of the puller, essentially the viscosity trip-point where the harder solenoid pull would be initiated. As has been found with silica fiber, lower velocity settings yielded better results, down to a minimum where the puller could not measure the velocity accurately. We also made several pulls with a maximal velocity setting and no solenoid pull, to observe the result of a pure "gravity pull", but these tips tended to be overly long and deformed. With velocity and heat settings as described above, the strength of the solenoid pull could be adjusted over a relatively large range to give good results. The delay parameter had little or no observed effect.

Smooth tapers with very small tips were obtained in this manner. No statistically significant correlation was obtained between the tip diameters and the pulling parameters, but the qualitative results were statistically reproducible. Several microtips were made with diameters estimated at about 100–200 nm.

However, the apparent physical diameter of the tip may not be an accurate reflection of what spatial resolution it will give, and in any event, actual performance numbers are more relevant. As has been discussed often in the SNOM literature, the resolution of the probe can be highly dependent on the topography of the specimen. To gauge the performance of our chalcogenide SNOM probes, we tested them in a microscope setup constructed at ISM-CNR for use with the Vanderbilt FEL. The first experiments with this setup measured the local reflectivity of a PtSi/Si system between 1.2 and 2.4 $\mu$m using silica fiber tips. The reflectivity in the SNOM images revealed features that were not present in the corresponding shear-force images and which were due to localized changes in the bulk properties of the sample.

The specimens examined in this study were polycrystalline diamond films prepared by plasma chemical vapor-phase deposition. The SNOM was first calibrated using standard silica fiber tips, then several topographical (shear-force) images were taken with the chalcogenide tips to verify that the data from the new tips correlated with the old. The chalcogenide tips were able to resolve even small features on the individual grains quite well. From these small features, we estimated the best lateral resolution of the probe (from the FWHM of diagonal cross-sections) to be between 50 and 80 nm. Since the surface was quite rough (at least on a nanoscopic scale), these images indicate that the probe aperture was somewhat smaller than our physical estimates. Also, since irregularities in the probe are expected to be a large detriment to lateral resolution on rough specimens, these topographical images indicate that the probe tip itself was smoothly rounded.

Since the films had been annealed to remove residual hydrogen and water, it was of greatest interest in the optical experiment to look for absorption near 3.5 $\mu$m due to the C-H vibrational stretch mode. Topographical and optical images were taken simultaneously, with the FEL illuminating the specimen over a broad area and the SNOM probe collecting the reflected light. When the FEL was tuned to 3.2 or 3.7 $\mu$m, outside the C-H absorption band (3.5 $\mu$m), the topographical image was reproduced, while the optical image became featureless, perhaps signifying residual hydrogen in the film. Though the relative intensity noise in the FEL (which could not be normalized out in the apparatus used for this experiment) is evident, several small features and edges were still resolved. From these, we estimated the optical lateral resolution to be between 100 and 150 nm, or about $\lambda/25$ to $\lambda/35$.

These results demonstrate clearly that singlemode chalcogenide fiber can yield excellent results in this novel FEL-SNOM combination. As this was the first attempt at such an experiment and many of the systems and indeed the probes themselves had not been fully optimized, we expect that these performance numbers will be surpassed in the near future. Applications for IR SNOM, especially at wavelengths longer than about 2 $\mu$m where silica fiber does not transmit, range from studies of buried semiconductor interfaces and implants to imaging of sub-cellular features in animal tissues. As interest grows in obtaining high resolution images of inorganic and biological specimens with distinguishing spectral features in the mid- to long-IR region, these probes could prove an indispensable research tool.

Obviously, many modifications and variations of the present invention are possible in light of the above teachings. It is therefore to be understood that, within the scope of the appended claims, the invention may be practiced otherwise than as specifically described.

What is claimed is:

1. A near-field optical microscope, comprising:

a single mode infrared optical fiber, having a probe end adapted as a probe for near-field optical microcopy, and further adapted for positioning within a near optical field of a sample, and wherein said optical fiber is selected from the group consisting of chalcogenide glass, chalcohalide glass and combinations thereof;

a source of infrared light adapted for illuminating said sample;

a detector of infrared light adapted for detecting infrared light reflected from, or transmitted through said sample;

wherein at least one of said source of infrared light and said detector of infrared light are optically coupled to a distal end of said single mode infrared optical fiber.

2. The near field optical microscope of claim 1, wherein said infrared optical fiber is a chalcogenide optical fiber.

3. The near field optical microscope of claim 1, wherein said infrared optical fiber is a chalcohalide optical fiber.

4. The near field optical microscope of claim 1, wherein said detector of infrared light is optically coupled to a distal end of said single mode infrared optical fiber.

5. The near field optical microscope of claim 1, wherein said source of infrared light is optically coupled to a distal end of said single mode infrared optical fiber.

6. The near field optical microscope of claim 1, wherein said probe is disposed on an opposing side of said sample from at least one of said source of infrared light and said detector of infrared light.

* * * * *